Dec. 15, 1942.   R. MILLER   2,305,439
HYDRAULIC COUPLING
Filed Nov. 22, 1941
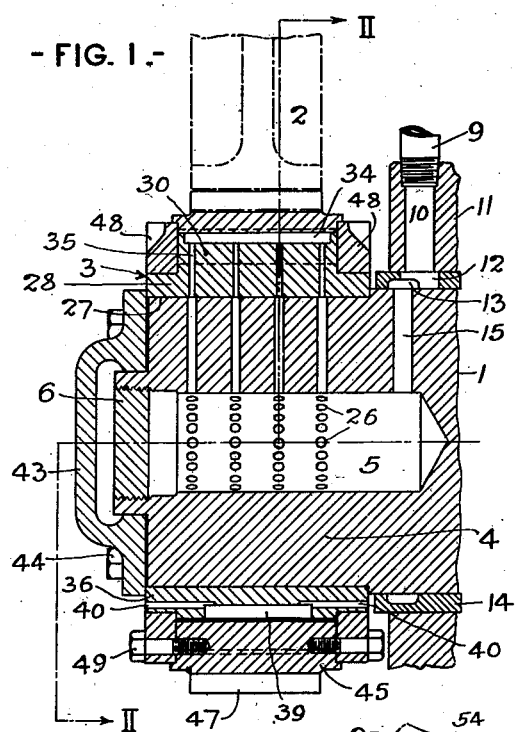
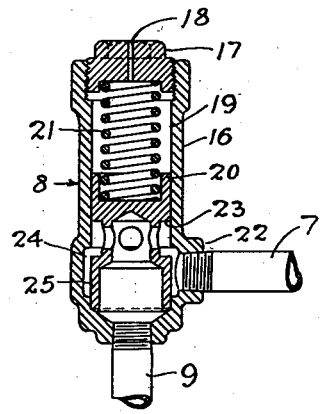
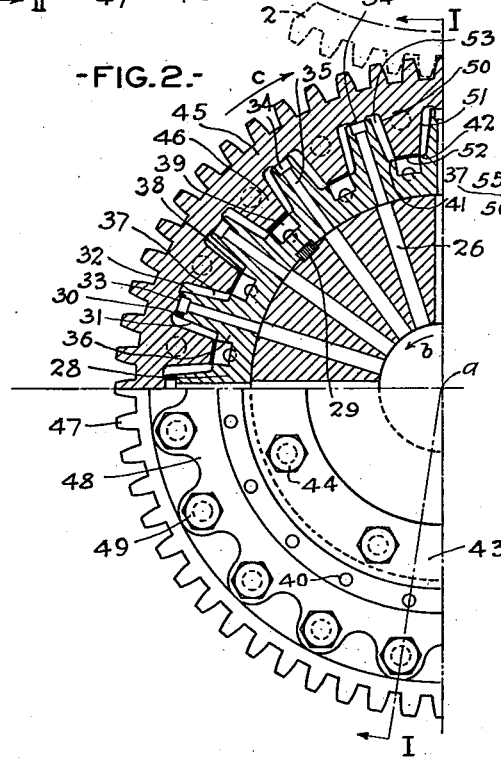
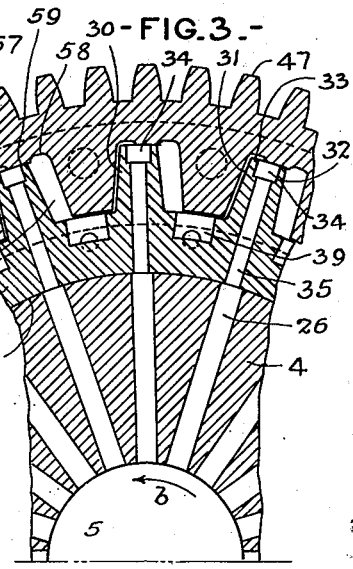
INVENTOR
Ralph Miller
BY
S. C. Yeaton
ATTORNEY Patented Dec. 15, 1942

2,305,439

UNITED STATES PATENT OFFICE 2,305,439

HYDRAULIC COUPLING

Ralph Miller, Buffalo, N. Y.

Application November 22, 1941, Serial No. 420,146

8 Claims. (Cl. 64—26)

This invention relates to hydraulic couplings.

An object of the present invention is to provide a hydraulic coupling having a driving member adapted to hydraulically drive a driven member, the coupling being adapted to transmit a constant torque at all running speeds.

A further object is to provide a coupling as aforesaid, the hydraulic fluid introduced to the coupling being throttled to produce a fluid pressure sufficient to balance the torque resulting from the driven load.

A further object is to provide a coupling which will hydraulically transmit the mean torque of the load but only a small fraction of the vibration torque.

A further object is to provide a coupling which will hydraulically transmit the maximum torque of a variable torque driven load such as an air compressor.

A further object is to provide a hydraulic coupling which will limit the transmitted vibration torque to substantially the torque corresponding to the peak of a variable torque load.

A further object is to provide a coupling as aforesaid flexibly connecting a drive shaft with a driven shaft, the hydraulic fluid being introduced to the coupling at a pressure not substantially above that required to drive the driven shaft at maximum load.

Other and further objects of this invention will appear from the following description, the accompanying drawing and the appended claims.

Referring to the drawing forming a part of this application, Figure 1 is a section, on the line I—I of Fig. 2, of the hydraulic coupling of the present invention, a portion of an engine with which the coupling is assembled being shown similarly in section, a driven gear being shown fragmentally in dot and dash lines, and parts being shown in full; Fig. 2 is an enlarged view of the structure of Fig. 1 taken on the line II—II of Fig. 1, the parts being shown in port-closed position, and the driven gear being shown fragmentally in dot and dash lines; Fig. 3 is a view similar to Fig. 2 showing a portion of the structure thereof enlarged, the parts being shown in a port-open position; and Fig. 4 is a central vertical sectional view of a pressure-regulating valve adapted for association with the hydraulic coupling, pipes leading thereto and therefrom being shown in full and fragmentally.

The hydraulic coupling of the present invention is adapted for employment in various types of apparatus, as for instance between an internal combustion engine and a piston pump brake air compressor for a railway vehicle, and the following description of the hydraulic coupling will be in connection with such adaptation.

Referring to the drawing, a drive shaft 1, which is the engine crank shaft, is connected to a driven gear 2, which is the gear for the crank shaft of the compressor (not shown), by a hydraulic coupling, indicated generally by the reference numeral 3, a part of the coupling being shown formed integrally with one end of the shaft 1, this part being hereinafter designated as a shaft 4. Shaft 4 may be made as a separate part attached to the shaft 1 if desired. Its axis a is in line with the axis of the shaft 1.

Shaft 4 is bored axially, providing a chamber 5 closed at its outer end by a threaded plug 6. Chamber 5 is filled with lubricating oil under pressure, this oil coming from a pump (not shown with which chamber 5 is in continuous communication. The pump sends oil under pressure through a pipe 7 connected to a pressure-regulating valve 8, through the valve 8 and therefrom through a pipe 9 to a passageway formed of a plurality of communicating parts, the parts being a bore 10 formed in a bearing 11, an orifice 12 opening into a circumferential groove 13, both formed in a bushing 14, the groove being in the bushing inner face, and a bore 15 formed in the journal of the shafting, the bearing, bushing and journal serving for both the shafts 1 and 4. The pipe 9 opens into the bore 10 and the bore 15 opens into the chamber 5, the chamber 5 being bored deeply enough to provide for this. While the bearing, bushing and journal are shown common to both the shafts 1 and 4, it will be understood that this is merely for simplicity of design and that these parts may be made independent of the engine and its shaft 1, as where the coupling is made in its entirety as a separate structure, the shaft 4 being adapted in such case to be detachably secured to the shaft 1. In other words, in any event the passageway connecting the pipe 9 with the chamber 5, considering the coupling in its entirety, is a part thereof.

The pump may be the regular engine lubricating pump, pumping crankcase oil under pressure to the hydraulic coupling, the oil serving as the hydraulic fluid. As it is desirable to maintain a uniform pressure in chamber 5, the pressure-regulating valve is inserted as aforesaid, between the pump and coupling, the valve serving to reduce the pressure of the oil coming from the pump and to maintain the reduced pressure substantially uniform.

Obviously if the hydraulic fluid was supplied to the coupling from a source at a substantially suitable constant pressure, the pressure-regulating valve would not be required. The regulating valve is employed where the source pressure is greater than that desirable for employment in the coupling. The employment of hydraulic fluid at a proper pressure is an important feature, as will later more fully appear.

The pressure-regulating valve may be of any well-known construction. A pressure-regulating valve well suited for association with the hydraulic coupling is shown in Fig. 4. It includes a housing 16 open at one end and connected to the bore 10 by the pipe 9. The housing is closed at its other end by a screw plug 17, having a vent orifice 18. A cylinder 19 is formed in the housing and a piston 20 is disposed in the cylinder and is urged toward the open end of the housing by a spring 21, which is energized to produce the desired pressure of the oil flowing from the pressure-regulating valve. A coupling flange 22, into which the pipe 7 is threaded, is formed in the wall of the housing in front of the piston working face 23. Pipe 7 opens into a circumferential groove 24 formed in the housing wall, and this groove is controlled by a valve 25 connected to the piston for movement therewith so that movement of the piston moves the valve to regulate the extent of opening of groove 24, thereby adjusting the flow of oil into the pressure-regulating valve.

The pressure-regulating valve acts only to reduce the pressure of the oil coming from the pump. Should oil be admitted to the pressure-regulating valve at a higher pressure than desirable, which is a pressure that would move the piston and further compress the spring, the valve will move to further partly blank out the groove 24, reducing the admission area to the pressure-regulating valve and thus reducing the pressure in the pressure-regulating valve.

Four axially spaced rows of radially extending bores 26 extend from chamber 5 to the outer face 27 of shaft 4 for a purpose presently to appear. The bores are aligned axially forming axial rows also of four bores 26 each.

The coupling 3 includes further a toothed ring 28 mounted on the shaft 4 and secured against rotation relative thereto by a key 29, the ring 28 and shaft 4 forming the driving member of the coupling. Ring 28 and shaft 4 may be integrally formed if desired. When made separately, ring 28 will bear at its inner end against a shoulder formed in shaft 4, as is clearly shown in Fig. 1. Ring 28 has a plurality of radially extending spaced similar teeth 30. Each tooth 30 extends axially over an axial row of four bores 26. Considering the shaft 4 rotating in the direction of the arrow b, each tooth 30 has a forward face 31, a rear face 32, and an outer circumferential face 33, faces 31 and 32 extending crosswise of the direction of rotation. Faces 31 and 32 of each tooth converge toward each other in an outward direction and are flat. Each face 33 is curved, the center of curvature being the axis a of the shaft 4. An axially extending port 34 is formed in each face 33, and each port 34 is in length sufficient to extend over the adjacent axial row of bores 26, the bores 26 of such axial row being connected to their respective port 34 by an axial row of four radial bores 35 formed in the ring 28, the bores 35 being disposed partially in the body 36 of the ring and partially in the teeth. Bores 26 and 35 form passageways for the flow of oil under pressure from chamber 5 to the ports 34.

Adjacent teeth 30 are separated by a space or groove 37, grooves 37 being similar to each other and of greater width than teeth 30. Each groove 37 has a curved bottom face 38, the center of curvature being the axis a. An axially extending port 39 is formed in each face 38 and these ports 39 are in continuous communication with the exterior of the coupling through axially extending bores 40, one extending in each direction through the body 36 from each end of each port 39, as is clearly shown at the bottom of Fig. 1. In the case of an internal combustion engine, bores 40 may open into the interior of the crank case.

Ports 39 do not occupy circumferentially the entire faces in which they are formed. There is thereby provided at the forward side of each port 39 a face 41, and at the rear side of each port 39 a face 42. Ring 28 is prevented from outward axial displacement relative to shaft 4 by a retainer 43 secured by tap bolts 44 to the shaft 4 and having a portion overlapping the outer edge of ring 28.

The coupling further includes a gear ring or driven member 45 circumferentially mounted on ring 28, for operation thereby through internal teeth 46 disposed one in each groove 37. Gear teeth 47 on the outer circumferential face of the ring 45 mesh with the teeth of gear 2 for driving the compressor. Ring 45 is prevented from displacement movement axially relative to ring 28 by retainer rings 48 disposed one on each side of the rings 28 and 45, overlapping both rings 28 and 45 and being bolted to the gear ring 45 by tap bolts 49. Teeth 46 are of less width than grooves 37.

Each tooth 46 has a forward face 50, a rear face 51 and a curved inner face 52, the center of curvature being the axis a. Faces 50 and 51 extend crosswise of the direction of rotation of shaft 4. The term "crosswise" as used in the claims and hereafter is not to be understood to mean necessarily strictly perpendicular to the plane of rotation of shaft 4, but the faces must be shaped and disposed to insure the proper operation of the coupling. When shaft 4 rotates in the direction of the arrow b, faces 51 are in advance of the driving faces of teeth 30, and when the rotation is in the opposite direction, faces 50 are in advance of the then driving faces of teeth 30. Faces 52 are substantially the same width as ports 39, so that they act as valves, blanking out ports 39, when the teeth 46 are centrally disposed in the grooves 37. Faces 52 are slightly spaced from faces 38, providing a slight clearance, as is clearly shown in Fig. 3. However, if desired, faces 52 may engage faces 38 with a working sliding fit.

The forward face 50 and rear face 51 of each tooth 46 diverge outwardly from its face 52. Teeth 46 are separated by spaces or grooves 53, there being a tooth 30 in each groove 53, the grooves 53 being wider circumferentially than the teeth 30. The retainer rings 48 provide end walls for the grooves 37 and 53. As grooves 37 and 53 are wider, respectively, than teeth 46 and 30, limited rotary relative movement between the ring 28 and the ring 45 is permitted. Each groove 53 has a curved bottom face 54, the center of curvature being the axis a.

From the foregoing description it will be apparent that provision is made for a space or chamber at each side of the teeth 46 and their adjacent teeth 30, the spaces adjacent and forward of the teeth 30 being indicated by the reference numeral 55 and to the rear thereof by the reference numeral 56. The width of these spaces determines the extent of the limited rotary relative movement between the rings.

A groove 57 is formed in each face 54 adjacent the rear face 51 of the tooth 46 at the forward side of the face 54, to permit opening of the adjacent port 34 when ring 28 and ring 45 are relatively disposed as shown in Fig. 3, each port 34 thus being placed in communication through its groove 57 with the space 55 adjacent thereto. Another groove 58 is formed in face 54 adjacent the forward face 50 of the tooth 46 at the rear side of the face 54.

The remainder of each face 54 between its grooves 57 and 58 forms a valve 59 of sufficient width and length to blank out the adjacent port 34 when the teeth 30 are centrally disposed in the grooves 53.

When ring 28 and ring 45 are relatively moved to open ports 34 as aforesaid, ports 39 are also opened, as is shown in Fig. 3, each port 39 opening into the adjacent space 56.

Grooves 58 permit opening of the ports 34, when rotation of shaft 4 is in a direction opposite to the arrow b, each port 34 thus being placed in communication, through a groove 58, with the adjacent space 56. Ports 39 would simultaneously then be opened into spaces 55.

When the engine, through the coupling, is driving equipment, there will be a torque exerted on the driven ring 45. With the shaft I rotating in the direction of arrow b, the driving torque will be in the direction of the arrow c. Oil will flow from chamber 5 through bores 26 and 35 to ports 34, and therefrom through grooves 57 to spaces 55. A reversal of torque, due to change in the direction of rotation of shaft I, or to some other factor, will cause flow through grooves 58 into spaces 56. In either event, there will be some leakage from spaces 55 or 56. If faces 52 engage faces 38, and the end faces of teeth 30 engage the end faces of grooves 53, provided by the retainer rings 48, with a working fit, this leakage will depend on the oil pressure in spaces 55 or 56. It is desirable, as will later appear, to employ a relatively low oil pressure in chamber 5 to transmit the load, and therefore gear 2 and ring 45 are suitably proportioned to enable such pressure to be employed. With this pressure the leakage will be slight. If greater leakage is desired than this pressure will provide for through the working fits, then obviously a definite amount of clearance may be provided for to obtain the leakage desired. Where compactness and high torque are required, however, it may be necessary to increase the operating pressure of the oil proportionately.

While the pressure in chamber 5 remains substantially uniform, and determines the maximum pressure in spaces 55 or 56, the pressure in spaces 55 or 56, as the case may be, varies, usually being lower than the pressure in chamber 5. Thus the opening area of ports 34 determines the pressure in spaces 55 or 56, acting usually as reducing valves.

Assume, for the purposes of illustration, that the engine is running in the direction of the arrow b, and that a constant torque is exerted on the ring 45 in the direction of the arrow c. The coupling will operate to maintain a pressure in spaces 55 sufficient to balance this torque, that is to say, to drive the compressor, the pressure in chamber 5 being sufficient for this. As oil is leaking out of spaces 55 between the faces 52 and the faces 42, the opening area of ports 34 must be just sufficient to replace this leakage and hold the rings 28 and 45 without rotary relative movement. Thus the opening area of the ports 34, to supply a quantity of oil to spaces 55 to transmit any given torque, is dependent upon the rate of leakage from spaces 55. If, instead of a constant torque, there is a continually varying torque exerted on ring 45, the opening area of ports 34 will continually vary to maintain a balance of torque.

The hydraulic coupling is adapted for employment with either a driving shaft which rotates in a single direction, or with a driving shaft adapted to rotate in either direction, and it operates similarly for both directions of rotation of the driving shaft. Its operation, confining the description to rotation in the direction of the arrow b, is as follows:

The coupling is adapted to hydraulically transmit all torques produced by the load of the equipment driven by the ring 45 during normal running of the engine. However, at starting, when the inertia of the equipment driven causes a temporary excessive torque and the oil pressure is negligible, the coupling will be unable to hydraulically transmit this excessive torque. In such event, the ring 28 will move relative to ring 45 until their teeth move into metal to metal contact, and the coupling will thus overcome the inertia. Such movement is cushioned by oil in the spaces 55. During this movement the inertia is flexibly overcome. However, after starting and during normal running of the engine, mechanical contact of the teeth of the rings will cease and the transmission will be hydraulic.

The drive shaft I rotates at non-uniform angular velocity. That is to say, the end of the shaft adjacent the coupling is twisted, this twist being caused by the torque transmitted through the coupling due to the load of the compressor, and by the torsional vibration of the shaft I. Such twisting causes the aforesaid limited rotary relative movement between the rings 28 and 45. During normal running of the engine and compressor, the maximum twist will not be sufficient to produce metal to metal contact of the teeth of the rings. This is due to the pressure of the oil supplied to the coupling and to the predetermined width of the spaces 55 and 56. With a proper oil pressure in the coupling, the grooves of the rings will be sufficiently wider than the teeth disposed therein to provide for maximum rotary relative movement of the rings resulting from such maximum twist, thus preventing, during normal running of the engine, metal to metal contact of the teeth. In other words, the coupling is torsionally flexible over a limited range, and elastically (hydraulically) isolates the mass of the compressor from the mass elastic system of the engine crank shaft.

In order for the coupling to hydraulically transmit the maximum compressor load torque, the pressure of the oil in chamber 5 must be sufficiently high to permit this transmission. As the torsional vibration torque transmitted by the coupling is limited to the pressure of the oil supplied to the coupling, it is desirable to have the oil pressure only slightly higher than that necessary to transmit maximum compressor load torque.

In Fig. 2 the rings are shown in a position which may be termed central position, the ports 34 being blanked out preventing flow of oil into spaces 55 and 56. Assume that the engine is running in the direction of the arrow b and that the compressor load torque on ring 45 is substantially constant and in the direction of the arrow c, and that the relative positions of the teeth 38 and 46 are substantially as shown in Fig. 3 due to excessive torque, with a correspondingly high fluid pressure in spaces 55. The normal running compressor load torque, which will be a less degree than this excessive torque, will thereupon result in widening the spaces 55 due to this high pressure in these spaces. This will move the ring 45 forward, reducing the opening area of the ports 34, until the pressure in the spaces 55 is just sufficient to balance the torque then exerted on the ring 45 by the load of the compressor.

Should the compressor load vary (either increase or decrease) there will be a corresponding movement of the ring 45 to adjust the pressure to balance the new torque. It will thus be seen that the pressure of the oil in the chamber 5 must be sufficient to take care of maximum compressor load. This maximum load is predetermined in order that the required pressure of the oil in chamber 5 may be predetermined which, as aforesaid, should be only slightly in excess of that required.

Thus it will be seen that by hydraulic means and under normal operation, the compressor equipment is entirely isolated from the engine crank shaft and thus it cannot in any way affect the engine crank shaft from a torsional vibration standpoint, and this is accomplished by a construction that prevents slippage between the shafts of the engine and compressor in the sense that slippage is understood in conventional hydraulic couplings. Of course, there is provision made for the limited rotary relative movements between the driving and driven members of the coupling, but as the average revolutions per minute of these members are equal at all running speeds of the engine, due to the interfitting teeth of the members, this limited movement is not considered slippage. The coupling therefore transmits a constant torque regardless of the running speed of the engine, and such transmission is hydraulic, the pressure of the oil in chamber 5 being independent of the speed of rotation of the coupling driving member. Thus there can be no loss of driving power in the coupling.

It will be understood that when the ports 34 are opened to the spaces 55, the spaces 56 are opened to the ports 39 and therefrom to the exterior of the coupling through the bores 40.

The foregoing operation of the coupler has been described disregarding the torsional vibrations of the crank shaft 1. While the principle of operation is believed correct, nevertheless in practice these torsional vibrations produce corresponding oscillations of the teeth 38 within their respective grooves 53. These oscillations may result in oil under pressure being admitted alternately to spaces 55 and 56, the ports 34 and 39 being suitably controlled to permit alternate admission and exhaust of oil to and from these spaces.

The oscillations of the teeth 38 are cushioned and resisted by the oil alternately in the spaces 55 and 56, and the torsional vibrations are thereby dampened.

It will further be noted that regardless of the force of these vibrations, they are cushioned by a fluid pressure only slightly greater than that required to hydraulically drive the compressor, which pressure limits the vibration torque transmitted by the coupling. It is mainly to prevent any harmful transmission of these vibrations that the oil supply in chamber 5 is maintained at a pressure equal to or only slightly above that required to hydraulically drive the compressor at maximum load. Maximum oscillations of the teeth 38 would effect an establishment of hydraulic fluid pressure in the spaces 55 and 56 substantially equal to the pressure in chamber 5. Therefore it is obvious that if this pressure in chamber 5 was excessive, that excessive fluid pressure would be established in these spaces, that is to say a pressure greater than that necessary to hydraulically drive the compressor. In such event the force of the oscillations would be transmitted through the coupling to the extent of the excessive pressure of the oil in chamber 5, which would be harmful to the compressor.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A power-transmitting hydraulic coupling comprising a rotary driving member; a rotary driven member having means for transmitting said power, one of said members being circumferentially mounted about the other of said members for rotation of said members in the same direction about a common axis, said members each having a plurality of teeth separated by grooves, the teeth of each member fitting in the grooves of the other member, said grooves being wider than the teeth disposed therein permitting limited rotary relative movement between said members, adjacent teeth having opposed faces disposed crosswise of the direction of rotation, the said opposed face of each driven member tooth being in advance of the said opposed face of said driving member tooth adjacent thereto and separated therefrom to provide a space for fluid under pressure for hydraulically driving said driven member by said driving member; ports in one of said members adapted to open each into one of said spaces; valves on the other of said members for controlling said ports operatively responsive to said relative movement; a source of supply in one of said members for hydraulic fluid under pressure; and means connecting said ports with said source for flow of fluid under pressure from said source into said spaces when said ports are open.

2. A power-transmitting hydraulic coupling comprising a rotary driving member; a rotary driven member having means for transmitting said power, circumferentially mounted about said driving member for rotation therewith in the same direction about a common axis, said members each having a plurality of teeth separated by grooves, the teeth of each member fitting in the grooves of the other member, said grooves being wider than the teeth disposed therein permitting limited rotary relative movement between said members, adjacent teeth having opposed faces disposed crosswise of the direction of rotation, the said opposed face of each driven member tooth being in advance of the said opposed face of said driving member tooth adjacent thereto and separated therefrom to provide a space for fluid under pressure for hydraulically driving said driven member by said driving member, said driving member teeth having outer faces opposite bottom faces of said driven member grooves; ports in said outer faces adapted to open each into one of said spaces; valves on said bottom faces adapted to control said ports, responsive to said relative movement; a chamber in said driving member for hydraulic fluid under pressure; and means connecting said ports with said chamber for flow of fluid under pressure from said chamber into said spaces when said ports are open.

3. A power-transmitting hydraulic coupling comprising a rotary driving member; a rotary driven member having means for transmitting said power, circumferentially mounted about said driving member for rotation therewith in the same direction about a common axis, said members each having a plurality of teeth separated by grooves, the teeth of each member fitting in the grooves of the other member, said grooves being wider than the teeth disposed therein permitting limited rotary relative movement between said members, and providing at the advance side of each driving member tooth a space for hydraulic fluid under pressure for hydraulically driving said driven member by said driving member, and at the rear side of each driving member tooth another space, said driving member teeth having outer faces opposite bottom faces of said driven member grooves and said driven member teeth having inner faces opposite bottom faces of said driving member grooves; inlet ports in said outer faces adapted to open each into one of said advance spaces; valves on said driven member groove bottom faces adapted to control said inlet ports; exhaust ports in said driving member groove bottom faces communicating with the exterior of said coupling and adapted to open each into one of said rear spaces, said exhaust ports being controlled by said inner faces, the control of said inlet and exhaust ports being responsive to said limited rotary relative movement; a chamber in the center portion of said driving member for hydraulic fluid under pressure; and radial passageways connecting said inlet ports with said chamber for flow of fluid under pressure from said chamber into said advance spaces.

4. A power-transmitting hydraulic coupling comprising a rotary driving member; a rotary driven member having means for transmitting said power, circumferentially mounted about said driving member for rotation therewith in the same direction about a common axis, said members each having a plurality of teeth separated by grooves, the teeth of each member fitting in the grooves of the other member, said grooves being wider than the teeth disposed therein permitting limited rotary relative movement between said members, and providing at the advance side of each driving member tooth a space for hydraulic fluid under pressure for hydraulically driving said driven member by said driving member, and at the rear side of each driving member tooth another space, said driving member teeth having outer faces opposite bottom faces of said driven member grooves and said driven member teeth having inner faces opposite bottom faces of said driving member grooves; inlet ports in said outer faces adapted to open each into one of said advance spaces; valves on said driven member groove bottom faces adapted to control said inlet ports; exhaust ports in said driving member groove bottom faces communicating with the exterior of said coupling and adapted to open each into one of said rear spaces, said exhaust ports being controlled by said inner faces, the control of said inlet and exhaust ports being responsive to said limited rotary relative movement; a chamber in the center portion of said driving member for hydraulic fluid under pressure; radial passageways connecting said inlet ports with said chamber for flow of fluid under pressure from said chamber into said advance spaces; and means permitting leakage of fluid from said advance spaces into said exhaust ports.

5. A power-transmitting hydraulic coupling comprising a rotary driving member; a rotary driven member having means for transmitting said power, circumferentially mounted about said driving member for rotation therewith in the same direction about a common axis, said members each having a plurality of teeth separated by grooves, the teeth of each member fitting in the grooves of the other member, said grooves being wider than the teeth disposed therein permitting limited rotary relative movement between said members, and providing spaces between opposed faces of adjacent teeth, said driving member teeth having outer faces opposite bottom faces of said driven member grooves; inlet ports in said outer faces adapted to open each into the spaces adjacent thereto; a chamber in the center portion of said driving member for hydraulic fluid under pressure; radial passageways connecting said inlet ports with said chamber for flow of fluid under pressure from said chamber into said spaces; and valves on said driven member groove bottom faces, each adapted to control the inlet port adjacent thereto for simultaneous supply of fluid to the spaces at one side of said driving teeth, or to the spaces at the other side thereof, dependently responsive to the direction of said relative movement.

6. A power-transmitting hydraulic coupling comprising a rotary driving member; a rotary driven member having means for transmitting said power, circumferentially mounted about said driving member for rotation therewith in the same direction about a common axis, said members each having a plurality of teeth separated by grooves, the teeth of each member fitting in the grooves of the other member, said grooves being wider than the teeth disposed therein permitting limited rotary relative movement between said members, and providing spaces between opposed faces of adjacent teeth, said driving member teeth having outer faces opposite bottom faces of said driven member grooves; inlet ports in said outer faces adapted to open each into the spaces adjacent thereto; a chamber in the center portion of said driving member for hydraulic fluid under pressure; radial passageways connecting said inlet ports with said chamber for flow of fluid under pressure from said chamber into said spaces; valves on said driven member groove bottom faces, each adapted to control the inlet port adjacent thereto for simultaneously supply of fluid to the spaces at one side of said driving teeth, or to the spaces at the other side thereof, dependently responsive to the direction of said relative movement, said driven member teeth having inner faces opposite bottom faces of said driving member grooves; and exhaust ports in said driving member groove bottom faces communicating with the exterior of said coupling and adapted to open each into the spaces adjacent thereto, the spaces on opposite sides of each driving tooth being simultaneously open one to the adjacent inlet port and the other to the adjacent exhaust port.

7. A power-transmitting hydraulic coupling comprising a rotary driving member; a rotary driven member having means for transmitting said power to drive a load, one of said members being circumferentially mounted about the other of said members for rotation of said members in the same direction about a common axis, said members each having a plurality of teeth separated by grooves, the teeth of each member fitting in the grooves of the other member, said grooves being wider than the teeth disposed therein permitting limited rotary relative movement between said members, adjacent teeth having opposed faces disposed crosswise of the direction of rotation, the said opposed face of each driven member tooth being in advance of the said opposed face of said driving member tooth adjacent thereto and separated therefrom to provide a space for fluid under driving pressure for hydraulically driving said driven member by said driving member; ports in one of said members adapted to open each into one of said spaces; valves on the other of said members for said ports, operated by said relative movement in response to the load driven for regulating the opening area of said ports to effect said driving pressure in said spaces; a source of supply in one of said members for hydraulic fluid under pressure; and means connecting said source with said ports for supply of said fluid thereto.

8. A power-transmitting hydraulic coupling comprising a rotary driving member; a rotary driven member having means for transmitting said power, circumferentially mounted about said driving member for rotation therewith in the same direction about a common axis, said members each having a plurality of teeth separated by grooves, the teeth of each member fitting in the grooves of the other member, said grooves being wider than the teeth disposed therein permitting limited rotary relative movement between said members, and providing at the advance side of each driving member tooth a space for hydraulic fluid under pressure for hydraulically driving said driven member by said driving member, and at the rear side of each driving member tooth another space, said driving member teeth having outer faces opposite bottom faces of said driven member grooves; inlet ports in said outer faces adapted to open each into the advance and rear spaces adjacent thereto; a chamber in the center portion of said driving member for hydraulic fluid under pressure; radial passageways connecting said inlet ports with said chamber for flow of fluid under pressure from said chamber into said advance and rear spaces; and valves on said driven member groove bottom faces each adapted to control the inlet port adjacent thereto for simultaneous supply of fluid to the advance spaces, or to the rear spaces, dependently responsive to the direction of said relative movement.

RALPH MILLER.